(12) United States Patent
Pankey et al.

(10) Patent No.: US 6,936,985 B2
(45) Date of Patent: Aug. 30, 2005

(54) SENSING DEVICE FOR DETERMINING A RAIN RATE

(75) Inventors: Brent W. Pankey, Ann Arbor, MI (US); Colin John Byrne, Ypsilanti, MI (US); Mark S. Ackerman, Howell, MI (US); Mitchell M. Rohde, Ann Arbor, MI (US); William J. Williams, Ann Arbor, MI (US)

(73) Assignee: AGC America, Inc., Ypsilanti, MI (US)

( * ) Notice: Subject to any disclaimer, the term of this patent is extended or adjusted under 35 U.S.C. 154(b) by 218 days.

(21) Appl. No.: 10/624,041

(22) Filed: Jul. 21, 2003

(65) Prior Publication Data

US 2005/0017666 A1 Jan. 27, 2005

(51) Int. Cl.⁷ ............................................. G05B 5/00
(52) U.S. Cl. ........................... 318/443; 318/DIG. 2; 318/444; 318/483; 318/445; 15/250.02; 15/250.12; 15/250.13
(58) Field of Search .................. 318/443–445, 318/483, DIG. 2; 15/250.02, 250.12, 250.13

(56) References Cited

U.S. PATENT DOCUMENTS

| | | | |
|---|---|---|---|
| 4,317,073 A | 2/1982 | Blaszkowski | |
| 4,499,410 A | 2/1985 | Iacoponi et al. | |
| 4,527,105 A | 7/1985 | Shiraishi | |
| 4,542,325 A | 9/1985 | Kobayashi et al. | |
| 4,584,508 A | 4/1986 | Kobayashi et al. | |
| 4,603,316 A * | 7/1986 | Kobayashi et al. | 340/602 |
| 4,740,735 A | 4/1988 | Hayashi | |
| 4,956,591 A | 9/1990 | Schierbeek et al. | |
| 5,017,847 A | 5/1991 | Leistenschneider | |
| 5,059,877 A | 10/1991 | Teder | |
| RE33,848 E | 3/1992 | Shiraishi | |
| 5,119,002 A | 6/1992 | Kato et al. | |
| 5,138,241 A * | 8/1992 | Shimizu et al. | 318/483 |
| 5,157,312 A | 10/1992 | Wallrafen | |
| 5,319,293 A | 6/1994 | Levers | |
| 5,436,060 A | 7/1995 | Saurer et al. | |
| 5,493,190 A | 2/1996 | Mueller | |
| 5,539,289 A * | 7/1996 | Wiget | 318/483 |
| 5,598,380 A * | 1/1997 | Saurer et al. | 367/140 |
| 5,729,106 A | 3/1998 | Pientke et al. | |
| 5,773,946 A | 6/1998 | Montero | |
| 5,804,719 A | 9/1998 | Didelot et al. | |
| 5,818,341 A | 10/1998 | Saurer et al. | |
| 5,844,389 A | 12/1998 | Pientka et al. | |
| 5,847,826 A * | 12/1998 | Fukui et al. | 356/335 |
| 5,872,437 A | 2/1999 | Pientka et al. | |
| 5,920,167 A | 7/1999 | Wiget et al. | |
| 5,990,647 A | 11/1999 | Zettler | |
| 6,015,449 A | 1/2000 | Hirota et al. | |
| 6,078,056 A | 6/2000 | Teder | |
| 6,091,065 A | 7/2000 | Teder | |

(Continued)

FOREIGN PATENT DOCUMENTS

| | | |
|---|---|---|
| EP | 0308990 A1 | 3/1989 |
| JP | 59045247 | 3/1984 |
| JP | 59045248 | 3/1984 |
| JP | 59045249 | 3/1984 |
| WO | WO-03027720 A1 | 4/2003 |

OTHER PUBLICATIONS

Pending U.S. Appl. No. 10/623,778, filed Jul. 21, 2003, Pankey et al.

*Primary Examiner*—Rina Duda
(74) *Attorney, Agent, or Firm*—Howard & Howard

(57) ABSTRACT

A sensing device includes a piezoelectric vibration sensor mounted to a surface for producing an analog signal proportional to raindrops striking the surface, an amplifier, an analog-to-digital converter, and a processor for calculating the rain rate based on an exponential probability density function of a first order point process.

35 Claims, 4 Drawing Sheets

U.S. PATENT DOCUMENTS

| | | |
|---|---|---|
| 6,124,691 A | 9/2000 | Teder |
| 6,144,022 A | 11/2000 | Tenenbaum et al. |
| 6,175,205 B1 | 1/2001 | Michenfelder et al. |
| 6,184,642 B1 | 2/2001 | Ausiello |
| 6,218,741 B1 | 4/2001 | Braun et al. |
| 6,232,603 B1 | 5/2001 | Nelson |
| 6,262,407 B1 | 7/2001 | Teder |
| 6,275,231 B1 | 8/2001 | Obradovich |
| 6,329,923 B2 | 12/2001 | Hog |
| 6,353,392 B1 | 3/2002 | Schofield et al. |
| 6,392,218 B1 | 5/2002 | Kuehnle |
| 6,420,845 B1 | 7/2002 | Mackel et al. |
| 2001/0028234 A1 | 10/2001 | Banhidy |
| 2001/0038335 A1 | 11/2001 | Hog |
| 2002/0020804 A1 | 2/2002 | Bauer et al. |

\* cited by examiner

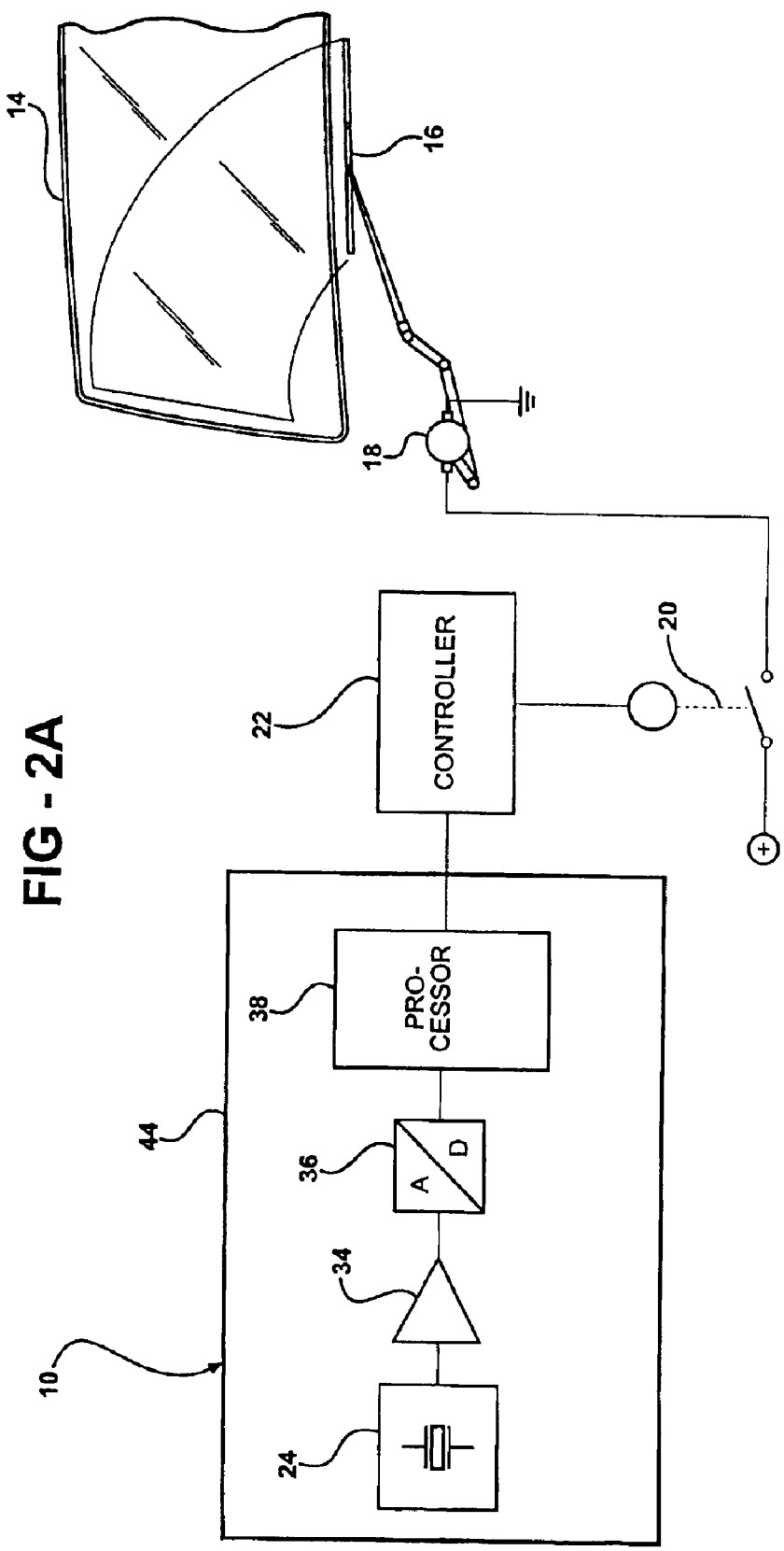

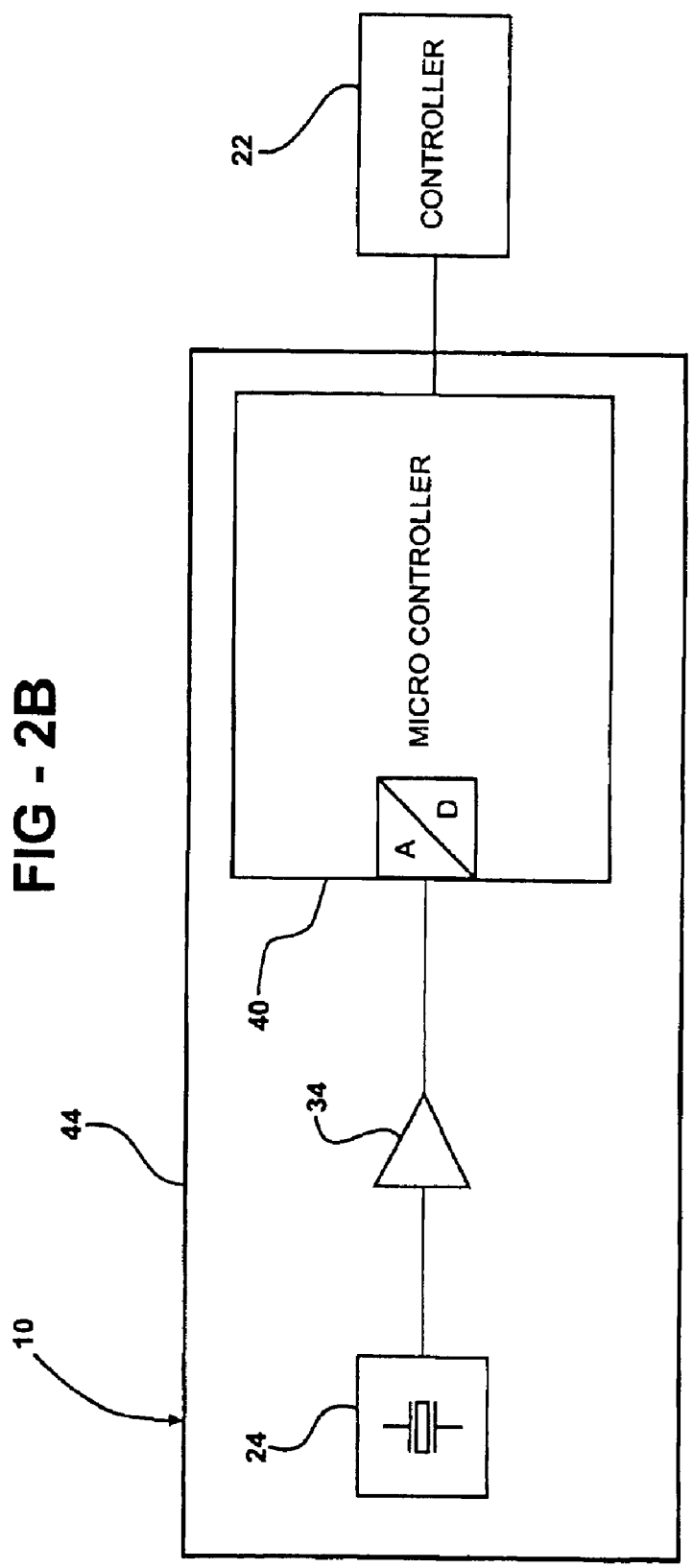

SENSING DEVICE FOR DETERMINING A RAIN RATE

BACKGROUND OF THE INVENTION

1. Field of the Invention

The subject invention generally relates to a sensing device for determining a rain rate on a surface. More specifically, the subject invention relates to a sensing device for determining the rain rate of raindrops striking a glazing (i.e. windshield, rear window, side windows, etc.) of a vehicle such that a wiper is activated to remove the raindrops from the glazing.

2. Description of the Related Art

Various sensing devices for detecting raindrops are known in the prior art. One example of such a device is disclosed in U.S. Pat. No. 5,119,002. Specifically, the '002 patent discloses a device which includes a piezoelectric vibration sensor, an amplifier, a processor, a motor, a wiper blade, and a windshield. The piezoelectric vibration sensor and the amplifier are disposed within a raindrop detector. The raindrop detector is placed on the hood of a vehicle. When raindrops strike the raindrop detector, vibrations are produced. The piezoelectric vibration sensor generates a signal corresponding to these raindrops. The amplifier increases an amplitude of the signal. The processor calculates an intermittent period based on the intensity of the signal and uses that intermittent period to operate the motor. The motor in turn moves the wiper blade.

The '002 patent does not disclose an analog-to-digital converter (ADC) to convert the analog signal into digital values. An ADC allows a processor to perform high-order algorithmic calculations on the digital values that represent the analog signal. Without the digital values, it is very difficult to determine the actual rain rate. In addition, the signal provided to the microprocessor will contain noise from non-rain vibrations, such as wind, engine vibrations, etc. The microprocessor of the '002 patent mistakenly utilizes the noise in calculating the intermittent period, leading to improper actuation of the wiper blade.

Another example of a sensing device of the prior art is disclosed in U.S. Pat. No. 5,059,877. The '877 patent discloses a sensor block mounted on a windshield. The sensor block includes an array of light emitting diodes (LEDs) and an array of phototransistors. A control system that is associated with the sensor block includes an amplifier and a microcontroller. The microcontroller includes an ADC and a processor to determine the rain rate of rain striking the windshield. The '877 patent does not disclose the use of a piezoelectric vibration sensor to generate a signal when raindrops strike the windshield. A piezoelectric vibration sensor can detect vibrations anywhere on the windshield, not just in the limited area that is illuminated by the LEDs of the '877 patent.

Due to the deficiencies in the sensing devices of the prior art, there remains an opportunity to introduce a sensing device that is capable of calculating the rain rate using an equation derived from a point process equation. Very little filtering or signal conditioning of non-rainfall vibrations is needed to very accurately determine the rain rate in this fashion.

SUMMARY OF THE INVENTION AND ADVANTAGES

The invention provides a sensing device for determining a rain rate on a surface, such as a glazing of a vehicle. The sensing device enables a wiper blade to move across the glazing to remove raindrops from the glazing. The sensing device includes a piezoelectric sensor, an amplifier, an analog-to-digital converter (ADC), and a processor. The piezoelectric sensor is mounted to the glazing and produces an analog signal proportional to vibrations caused by raindrops striking the glazing. The amplifier is electrically connected to the piezoelectric sensor for increasing an amplitude of the analog signal. The ADC is electrically connected to the amplifier for converting the analog signal into digital values. The processor is electrically connected to the ADC to receive the digital values. The processor computes the rain rate by using an equation derived from a point process equation.

The sensing device of the subject invention provides several advantages over the related art. One such advantage is the use of a point process, more specifically the use of a first order point process. The first order point process is also known, by those skilled in the art, as a Poisson process. Statistics of rainfall naturally exhibit the characteristics of a point process. Accordingly, the processor is capable of performing calculations using an equation derived from a point process equation to allow for a very accurate estimation of the rain rate. In addition, very little filtering or signal conditioning of non-rainfall vibrations is needed to determine the rain rate using the equation based on the point process equation. Of course, filtering may be added to reduce the amount of amplified noise in the analog signal.

The calculation of the rain rate inherently does not react to non-rainfall vibrations that may be present, since these non-rainfall vibrations do not exhibit the statistical characteristics of a point process. Examples of these non-rainfall vibrations include, but are not limited to, rocks hitting the vehicle, wind noise, and acoustical vibrations caused by speech or a vehicle's sound system.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 2A–2C are a schematic block diagram of the sensing device;

DETAILED DESCRIPTION OF THE PREFERRED EMBODIMENT

Referring to the Figures, wherein like numerals indicate like or corresponding parts throughout the several views, a sensing device is generally shown at 10. The sensing device 10 of the subject invention includes the ability to determine a rain rate of rain striking a surface 26.

Figure 1:
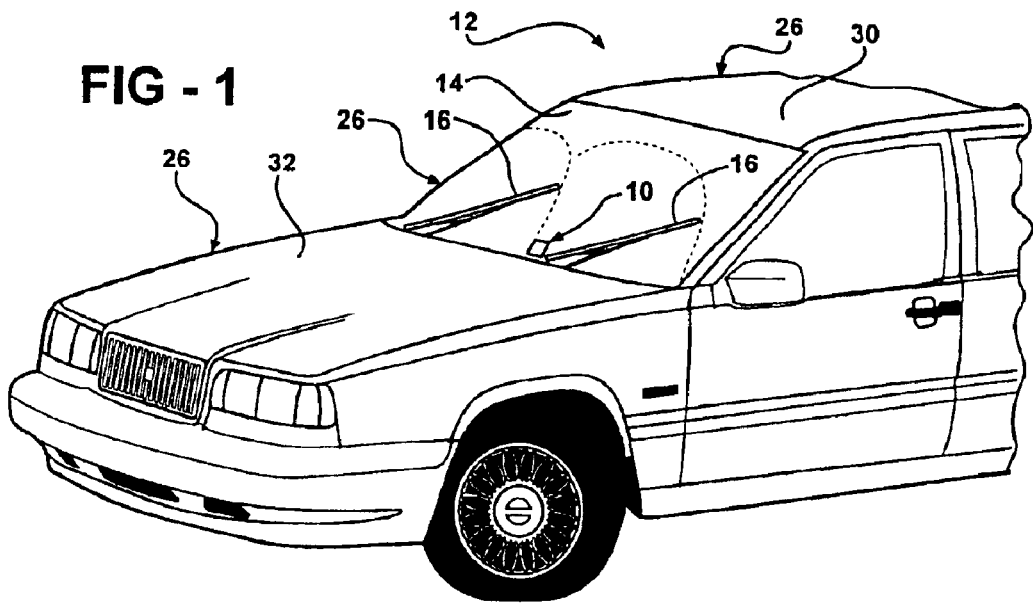
FIG. 1 is a perspective view of a vehicle incorporating a sensing device according to the subject invention.

Referring to FIG. 1, the vehicle 12 includes a vehicle glazing 14 and at least one wiper blade 16. Preferably, as disclosed in FIG. 1, two wiper blades 16 are utilized. The wiper blades 16 move across the glazing 14 to remove raindrops from the glazing 14. Those skilled in the art appreciate that the glazing 14 of a vehicle may include, but is not limited to, a windshield, a back window, or a side window of a vehicle.

Referring now to FIG. 2, at least one motor 18 is operatively connected to the wiper blades 16 for moving the wiper blades 16 across the glazing 14. Preferably, only one motor 18 is needed for the two wiper blades 16. At least one switch 20 is operatively connected to the motor 18 for activating the motor 18. Preferably, only one switch 20 is necessary for the one motor 18. However, it is to be understood, that the wiper blades 16, motor 18, and switch 20 can be configured differently without varying the scope of the subject invention.

A controller 22 is operatively connected to the switch 20. The controller 22 activates the switch 20, which in turn activates the motor 18, which then causes the wiper blades 16 to move across the glazing 14 and remove the raindrops from the glazing 14.

The sensing device includes a piezoelectric sensor 24. Referring again to FIG. 1, the piezoelectric sensor is mounted to a surface 26 of the vehicle 12. It is preferred that the piezoelectric sensor 24 is mounted to the glazing 14, therefore described below only in terms of the glazing 14 being the surface 26. However, it is to be understood that in alternative embodiments, the piezoelectric sensor 24 can be mounted to a roof 30, or hood 32 of the vehicle, etc. It is to be understood that different vibration characteristics of the vehicle 12 occur at different locations on the vehicle 12. Hence, additional provisions, such as filtering or absorption, may be necessary depending on a mounting location for and properties of the piezoelectric sensor 24. It is preferred that the piezoelectric sensor 12 is mounted at a center line of the glazing 14, however, other locations on the glazing are also acceptable.

Preferably, the piezoelectric sensor 24 is a high temperature thin film-type piezoelectric sensor. An example of a suitable piezoelectric sensor is a piezoelectric sensor that has properties such as a sensitivity of 5 mV/g, a measurement range of ±1000 g peak, and a frequency range of 0.01 to $10^9$ Hz. However, other piezoelectric sensors are acceptable.

Referring again to FIG. 2a, the piezoelectric sensor 24 produces an analog signal proportional to vibrations caused by the raindrops striking the glazing 14. The analog signal produced by the piezoelectric sensor 24 has a very small amplitude, as seen by the sensitivity of the piezoelectric sensor 24. This very small amplitude, in the millivolt range, cannot be useful when directly interfaced with standard microelectronic components that operate in the decivolt range. As a result, the sensing device 10 also includes an amplifier 34 that is electrically connected to the piezoelectric sensor 24. The amplifier 34 increases the amplitude of the analog signal such that the analog signal can be utilized by other components.

The sensing device 10 further includes an analog-to-digital converter (ADC) 36 and a processor 38. The ADC 36 is electrically connected to the amplifier 34. The ADC 36 converts the analog signal into digital values. The processor 38 is electrically connected to the ADC 36 and the controller 22.

The processor 38 computes a rain rate by using the digital values, provided by the ADC 36, in an equation derived from a point process equation. The point process equation is further defined as an exponential probability density function of a first order point process and is represented by the equation $f(t)=\lambda e^{-\lambda t}$, where $f(t)$ represents a theoretical form of the first order point process, $\lambda$ represents the rain rate, and t represents time values between raindrops striking the surface. The analog signal includes peaks that occur when the raindrops strike the surface. These peaks are encoded in the digital values. In order to calculate the rain rate $\lambda$, the processor 38 must be capable of determining the peaks encoded in the digital values. The processor 38 must also be capable of determining time intervals between the peaks. The time intervals between a first time and a second time that fall in a first range are summed by the processor 38, creating a number $n_1$. The processor 38 must also sum a number $n_2$ of time intervals between the second time and a third time that fall in a second range.

A first embodiment requires that the processor 38 maintain the first range and the second range of time intervals equal in a time span w. The processor 38 must then be capable of determining an intermediate rain rate $\lambda_{int}$ using the equation $\lambda_{int}=-2 \cdot (n_2-n_1)/w(n_2+n_1)$. Next, the intermediate rain rate $\lambda_{int}$ is successively determined by the processor. To conclude the first embodiment, the processor must be capable of averaging the intermediate rain rates $\lambda_{int}$ to determine the rain rate $\lambda$.

In a second embodiment, the first range of time intervals is further defined as all time intervals less than or equal to the second time. The second range of the time intervals is further defined as all time intervals greater than the second time. To determine the rain rate $\lambda$ using the second embodiment, the processor must be capable of calculating an equation $\lambda=n_1/n_2$.

A third embodiment is similar to the second embodiment. However, the third embodiment provides a more accurate determination of the rain rate $\lambda$ than the second embodiment. The first range of time intervals is further defined as all time intervals less than or equal to the second time. The second range of the time intervals is further defined as all time intervals greater than the second time. To determine the rain rate $\lambda$ using the third embodiment, the processor must be capable of calculating an equation $\lambda=n_1/(T * n_2)$, where T represents the second time.

Once the rain rate $\lambda$ is determined, the processor 38 then provides the computed rain rate to the controller 22. The controller 22 automatically operates the wiper blades 16 to remove raindrops from the glazing 14 based on the rain rate.

In an alternative embodiment, as shown in FIG. 2b, the ADC 36 and the processor 38 are incorporated into a single microcontroller 40. In this embodiment, the microcontroller 40 is electrically connected to the amplifier 34 and the controller 22. An example of a suitable microcontroller 40 is the PIC12C672 manufactured by Microchip Technology Inc. of Chandler, Ariz. This particular microcontroller has a RISC architecture and a 8-bit ADC, operates at 4 MHz with an internal oscillator or 10 MHz with an external oscillator, can perform one single cycle instruction every 400 ns, and includes 128 bytes of data RAM and 2048 bytes of Program EEPROM. Of course, as is evident to those skilled in the art, other suitable microcontrollers that meet these requirements are acceptable.

Figure 2C:
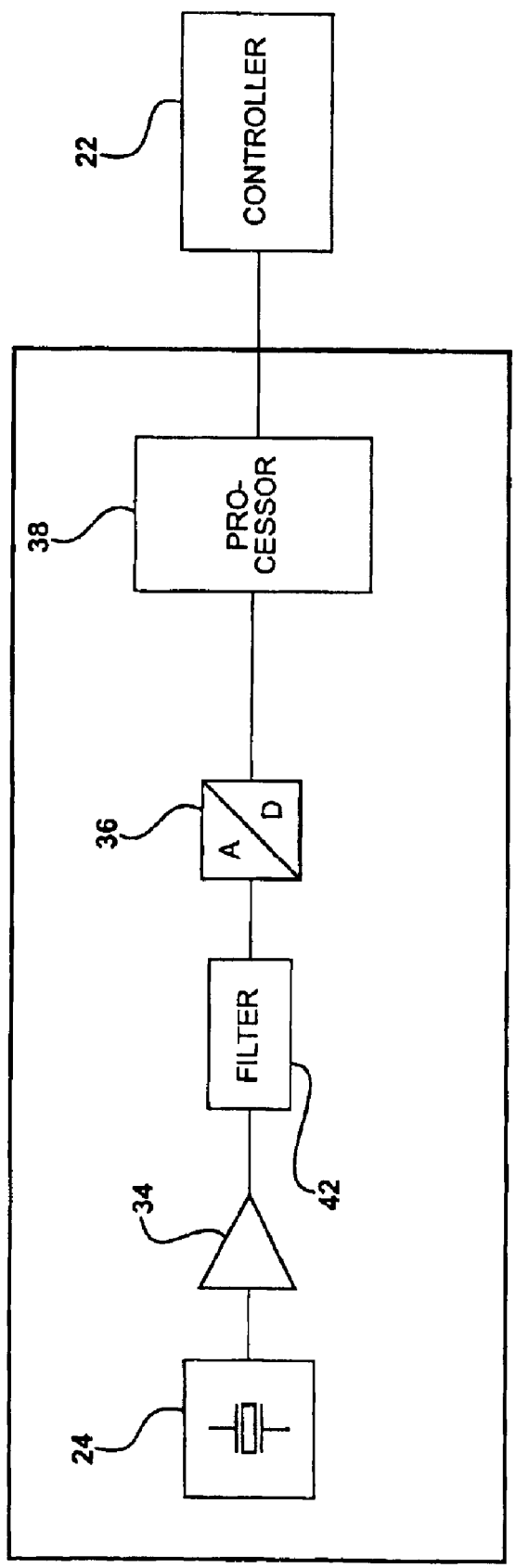

Referring now to FIG. 2c, the sensing device 10 may also include a filter 42 to remove noise from the analog signal. The filter 42 is electrically connected to the amplifier 34 and the ADC 36. The filter 42 is a band-pass filter to pass frequencies between approximately 4 kHz and approximately 8 kHz. Preferably, the filter 42 is a standard fixed analog-type filter. However, other type of filters, such as a switched capacitive filter embodied in an integrated circuit, could also be used.

The sensing device may also include a flexible circuit board 44. The flexible circuit board 44 supports and electrically connects the piezoelectric sensor 24, the amplifier 34, the ADC 36, the filter 42, and the processor 38. It is known, to those skilled in the art, that flexible circuit boards are also termed flex circuits, flexible printed circuits, and the like. Flexible circuit boards can be bent, twisted, and folded to fit into space restrictive configurations.

Figure 3A:
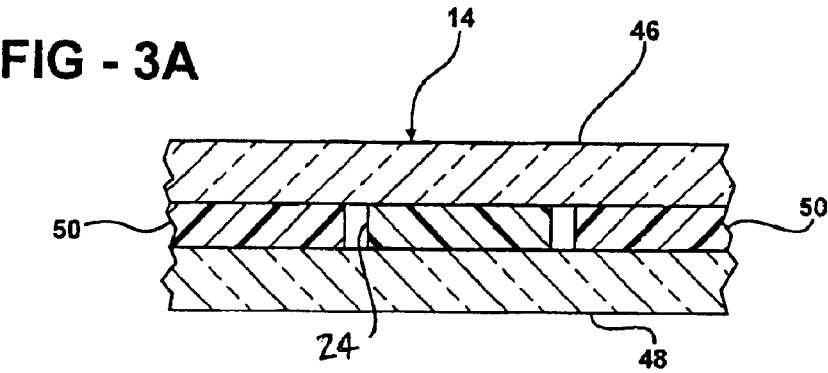
FIG. 3a is a cross-sectional view of a glazing, illustrating the piezoelectric sensor disposed between a first glazing pane and a second glazing pane.
Figure 3B:
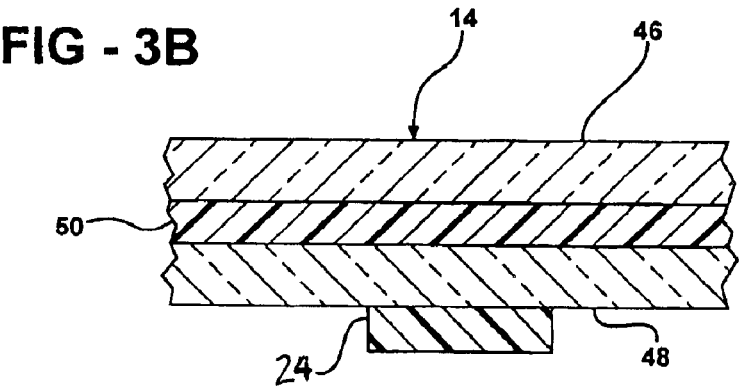
FIG. 3b is a cross-sectional view of the glazing, showing the sensing device attached to the glazing.

Referring to FIGS. 3a and 3b, the vehicle glazing 12 is further defined as a first glazing pane 36 and a second glazing pane 38. The first and second glazing panes 36, 38 are preferably made of glass, however other substances, such as resin, can be used instead of glass. Typically, the first and second glazing panes 36, 38 are affixed together with a polymer adhesive 40.

The flexible circuit board 44 may be mounted on or in the glazing 12 in a variety of locations. In one embodiment, as disclosed in FIG. 3a, the piezoelectric sensor 24 is disposed between the first and second glazing panes 36, 38. In another embodiment, disclosed in FIG. 3b, the piezoelectric sensor 24 is affixed to the glazing 12, either inside or outside of the vehicle 10.

Obviously, many modifications and variations of the present invention are possible in light of the above teachings. The invention may be practiced otherwise than as specifically described within the scope of the appended claims.

What is claimed is:

1. A vehicle comprising:
   a vehicle glazing;
   at least one wiper blade for moving across said glazing to remove raindrops from said glazing;
   a controller operatively connected to said wiper blade for activating said wiper blade;
   a piezoelectric sensor mounted to said glazing that produces an analog signal proportional to vibrations caused by raindrops striking said glazing;
   an amplifier electrically connected to said piezoelectric sensor for increasing an amplitude of said analog signal;
   an analog-to-digital converter electrically connected to said amplifier for converting said analog signal into digital values; and
   a processor electrically connected to said analog-to-digital converter and said controller for computing a rain rate with said digital values in an equation derived from a point process equation and for providing said rain rate to said controller such that said controller automatically operates said wiper blade to remove raindrops based on said rain rate.

2. The vehicle as set forth in claim 1 wherein said equation derived from a point process equation is further defined as an exponential probability density function of a first order point process, said function defined by the equation $f(t)=\lambda e^{-\lambda t}$, where f(t) represents a theoretical form of the first order point process, $\lambda$ represents said rain rate, and t represents time between said raindrops striking said glazing.

3. The vehicle as set forth in claim 1 further comprising at least one motor operatively connected to said controller and said wiper blade for moving said wiper blade across said glazing.

4. The vehicle as set forth in claim 3 further comprising at least one switch operatively connected to said at least one motor and said controller for activating said at least one motor.

5. The vehicle as set forth in claim 1 further comprising a flexible circuit board for supporting and electrically connecting said piezoelectric sensor, said amplifier, said analog-to-digital converter, and said processor.

6. The vehicle as set forth in claim 5 wherein said flexible circuit board is affixed to said glazing.

7. The vehicle as set forth in claim 1 wherein said vehicle glazing is further defined as a first glazing pane and a second glazing pane.

8. The vehicle as set forth in claim 7 wherein said piezoelectric sensor is disposed between said first and second glazing panes.

9. The vehicle as set forth in claim 1 further comprising a microcontroller electrically connected to said amplifier and said controller wherein said analog-to-digital converter and said processor are components of said microcontroller.

10. The vehicle as set forth in claim 1 wherein said piezoelectric sensor is further defined as a high temperature thin film piezoelectric sensor.

11. The vehicle as set forth in claim 1 further comprising a filter operatively connected to said amplifier and said analog-to-digital converter for removing noise from said analog signal.

12. The vehicle as set forth in claim 11 further comprising a flexible circuit board for supporting and electrically connecting said piezoelectric sensor, said amplifier, said analog-to-digital converter, said filter, and said processor.

13. The vehicle as set forth in claim 12 wherein said flexible circuit board is affixed to said glazing.

14. The vehicle as set forth in claim 12 wherein said vehicle glazing is further defined as a first glazing pane and a second glazing pane.

15. The vehicle as set forth in claim 14 wherein said flexible circuit board is located between said first and second glazing panes.

16. A vehicle glazing for determining a rain rate, said glazing comprising:
   at least one glazing pane;
   a piezoelectric sensor mounted to said glazing pane and producing an analog signal proportional to vibrations caused by raindrops striking said glazing pane;
   an amplifier electrically connected to said piezoelectric sensor for increasing an amplitude of said analog signal;
   an analog-to-digital converter electrically connected to said amplifier for converting said analog signal into digital values; and
   a processor electrically connected to said analog-to-digital converter for computing a rain rate with said digital values in an equation derived from a point process equation to determine the rain rate.

17. The vehicle glazing as set forth in claim 16 wherein said equation derived from a point process equation is an exponential probability density function of a first order point process, said function defined by the equation $f(t)=\lambda e^{-\lambda t}$ where f(t) represents a theoretical form of the first order point process, $\lambda$ represents said rain rate, and t represents time between said raindrops striking said glazing.

18. The vehicle glazing as set forth in claim 16 further comprising a flexible circuit board for supporting and electrically connecting said piezoelectric sensor, said amplifier, said analog-to-digital converter, and said processor.

19. The vehicle as set forth in claim 18 wherein said flexible circuit board is affixed to said at least one glazing pane.

20. The vehicle glazing as set forth in claim 16 wherein said at least one glazing pane is further defined as a first glazing pane and a second glazing pane.

21. The vehicle as set forth in claim 20 wherein said piezoelectric sensor is located between said first and second glazing panes.

22. The vehicle glazing as set forth in claim 16 further comprising a microcontroller electrically connected to said amplifier and said controller wherein said analog-to-digital converter and said processor are components of said microcontroller.

23. The vehicle glazing as set forth in claim 16 wherein said piezoelectric sensor is a high temperature thin film piezoelectric sensor.

24. The vehicle glazing as set forth in claim 16 further comprising a filter operatively connected to said amplifier and said analog-to-digital converter for removing noise from said analog signal.

25. The vehicle glazing as set forth in claim 24, further comprising a flexible circuit board for supporting and electrically connecting said piezoelectric sensor, said amplifier, said analog-to-digital converter, said filter, and said processor.

26. The vehicle as set forth in claim 25 wherein said flexible circuit board is affixed to said at least one glazing pane.

27. The vehicle glazing as set forth in claim 25 wherein said at least one glazing pane is further defined as a first glazing pane and a second glazing pane.

28. The vehicle as set forth in claim 27 wherein said flexible circuit board is located between said first glazing pane and said second glazing pane.

29. A sensing device for determining a rain rate on a surface, said device comprising:

a piezoelectric sensor that produces an analog signal proportional to vibrations caused by raindrops striking the surface;

an amplifier operatively connected to said piezoelectric sensor for increasing an amplitude of said analog signal;

an analog-to-digital converter operatively connected to said amplifier for converting said analog signal into digital values; and a processor operatively connected to said analog-to-digital converter for computing the rain rate using said digital values in an equation derived from a point process equation to determine the rain rate.

30. The sensing device as set forth in claim 29 wherein said equation derived from a point process equation is further defined as an exponential probability density function of a first order point process, said function defined by the equation $f(t)=\lambda e^{-\lambda t}$, where $f(t)$ represents a theoretical form of the first order point process, $\lambda$ represents said rain rate, and t represents time between said raindrops striking said surface.

31. The sensing device as set forth in claim 29 further comprising a microcontroller electrically connected to said amplifier and said controller wherein said analog-to-digital converter and said processor are components of said microcontroller.

32. The sensing device as set forth in claim 29 further comprising a microcontroller for performing the functions of said analog-to-digital converter and said processor.

33. The sensing device as set forth in claim 29 wherein said piezoelectric sensor is a high temperature thin film piezoelectric sensor.

34. The sensing device as set forth in claim 29 further comprising a filter operatively connected to said amplifier and said analog-to-digital converter for removing noise from said analog signal.

35. The sensing device as set forth in claim 34 further comprising a flexible circuit board for supporting and electrically connecting said piezoelectric sensor, said amplifier, said analog-to-digital converter, said filter, and said processor.

* * * * *